(12) United States Patent
Suda et al.

(10) Patent No.: US 11,999,416 B2
(45) Date of Patent: Jun. 4, 2024

(54) STEERING CONTROL DEVICE FOR A WORK VEHICLE

(71) Applicant: KABUSHIKI KAISHA AICHI CORPORATION, Saitama (JP)

(72) Inventors: Motoaki Suda, Okegawa (JP); Kotaro Terada, Kitamoto (JP)

(73) Assignee: KABUSHIKI KAISHA AICHI CORPORATION, Saitama (JP)

( * ) Notice: Subject to any disclaimer, the term of this patent is extended or adjusted under 35 U.S.C. 154(b) by 299 days.

(21) Appl. No.: 17/472,949

(22) Filed: Sep. 13, 2021

(65) Prior Publication Data

US 2022/0119035 A1 Apr. 21, 2022

(30) Foreign Application Priority Data

Oct. 15, 2020 (JP) .................................. 2020-173698

(51) Int. Cl.
*B62D 5/04* (2006.01)
*B62D 1/185* (2006.01)
*B62D 15/02* (2006.01)

(52) U.S. Cl.
CPC .......... *B62D 5/0457* (2013.01); *B62D 1/185* (2013.01); *B62D 15/0215* (2013.01)

(58) Field of Classification Search
CPC ... B62D 5/0457; B62D 1/185; B62D 15/0215
See application file for complete search history.

(56) References Cited

U.S. PATENT DOCUMENTS 7,957,866 B2 * 6/2011 Oba .................... B66F 11/04
701/19

FOREIGN PATENT DOCUMENTS

JP 2006-335094 A 12/2006
JP 2018170873 A * 11/2018

OTHER PUBLICATIONS

Machine Translation of JP2018170873A PDF File Name: "JP2018170873A_Machine_Translation.pdf".*

* cited by examiner

*Primary Examiner* — Grant Moubry
*Assistant Examiner* — Ruben Picon-Feliciano
(74) *Attorney, Agent, or Firm* — Studebaker & Brackett PC

(57) ABSTRACT

A steering control device for a vehicle with an aerial work platform 1 in the embodiment a traveling body capable of traveling with a steering wheel, a work platform 30 provided thereon, a steering dial 42, which is biased to be located at a neutral position in a non-operation status, a steering angle detector 62, a steering cylinder 17, and a controller 50 for controlling an operation of the steering cylinder 17. The controller 50 controls the steering cylinder 17 so that a steering angle of the steering wheel becomes a target steering angle corresponding to a steering position of the steering operation tool. As far as a steering angle of the steering wheel detected by the steering angle detector is kept within a predetermined angle range including a neutral steering angle, the steering control unit make a steering control to stop the steering actuator and to maintain the present steering angle of the steering wheel when the steering operation tool returns to the neutral position.

3 Claims, 6 Drawing Sheets

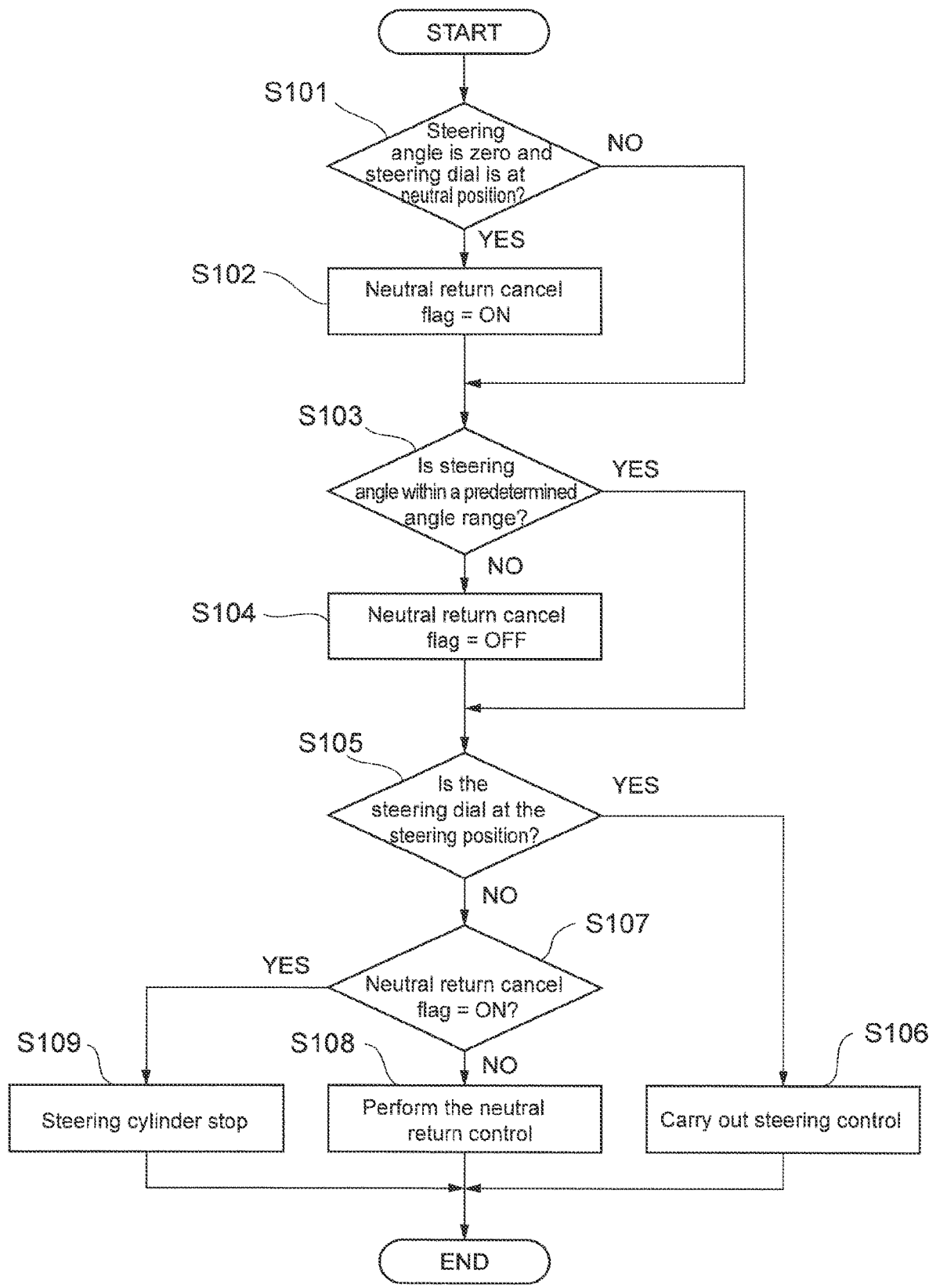

STEERING CONTROL DEVICE FOR A WORK VEHICLE

TECHNICAL FIELD

The present invention relates to a steering control device for a work vehicle comprising work equipment provided on a traveling body.

TECHNICAL BACKGROUND

As a work vehicle in which work equipment is provided on a wheel-driven traveling body, for example, a vehicle with an aerial work platform in which a work platform is attached to the traveling body via a lifting means is known. There are various types of such vehicles with an aerial work platform, including a relatively small traveling body provided with a vertical lifting device (telescopic post, scissors mechanism, etc.) and a work platform attached to the vertical lifting device. In such a vehicle with an aerial work platform, an operator on a work platform can operate the traveling body and the work platform from the work platform (see, for example, Japanese Laid-Open Patent Publication No. 2006-335094(A)).

In travelling operation of this type of work vehicle, an operator operates a traveling operation tool for starting and stopping the traveling body and switching forward and rearward movement of the traveling body (e.g., composed of a lever, a dial, or the like) and a steering operation tool for steering the traveling body, i.e., for steering operation (e.g., composed of a lever, a dial, or the like). When the operator on the work platform operates the steering operation tool, the controller operates the steering actuator so that the steering angle of the steering wheel detected by the steering angle detector becomes the target steering angle of the steering wheel set in accordance with the operation status of the steering operation tool, and changes the steering angle of the steering wheel via the link mechanism. The steering angle of the steering wheel refers to a deflection angle of the steering wheel with respect to the longitudinal central axis of the traveling body.

SUMMARY OF THE INVENTION

Problems to be Solved by the Invention

In the above-described work vehicle, when a hand operation by an operator is released from the steering operation tool in the operation status, the steering operation tool returns to the neutral position by the force of a spring or the like, and the target steering angle becomes zero. Therefore, when it is desired to slightly change the traveling direction of the traveling body from a straight line when the traveling body is traveling over a long distance, it was necessary to continue the operation of the steering operation tool within a position range near the neutral position, which was one of the causes of deterioration in operability during long-distance traveling.

The present invention is made in consideration of such a problem. Therefore, it is a purpose of the present invention to provide a steering control device for a work vehicle capable of improving operability during a long-distance drive.

Means to Solve the Problems

In order to achieve such an object, a steering control device for a work vehicle (for example, a vehicle with an aerial work platform 1 in the embodiment) according to the present invention comprises a traveling body capable of traveling with a steering wheel, a work equipment (for example, a work platform 30 in the embodiment) provided on the traveling body, a steering operation tool (for example, a steering dial 42 in the embodiment), which is biased to be located at a neutral position in a non-operation status, for making a steering operation by being displaced from the neutral position, a steering angle detector for detecting a steering angle of the steering wheel, a steering actuator (for example, a steering cylinder 17 in the embodiment) for changing the steering angle of the steering wheel, and a steering control unit for controlling an operation of the steering actuator so that a steering angle of the steering wheel detected by the steering angle detector becomes a target steering angle corresponding to a steering position of the steering operation tool. As far as a steering angle of the steering wheel detected by the steering angle detector is kept within a predetermined angle range including a neutral steering angle, the steering control unit make a steering control to stop the steering actuator and to maintain the present steering angle of the steering wheel when the steering operation tool returns to the neutral position.

In the steering control device for the work vehicle described above, it is preferable that when a steering angle of the steering wheel detected by the steering angle detector exceeds the predetermined angle range, the steering control unit make a steering control to operate the steering actuator so that the steering angle of the steering wheel becomes the neutral steering angle when the steering operation tool returns to the neutral position.

In the steering control device for a work vehicle described above, it is preferable that as far as a steering angle of the steering wheel detected by the steering angle detector is changed within the predetermined angle range during a steering operation of the steering operation tool, the steering control unit make a steering control to stop the steering actuator and to maintain the present steering angle of the steering wheel when the steering operation tool returns to the neutral position. Further, when a steering angle of the steering wheel detected by the steering angle detector exceeds the predetermined angle range during a steering operation of the steering operation tool, the steering control unit make a steering control to operate the steering actuator so that the steering angle of the steering wheel becomes the neutral steering angle when the steering operation tool returns to the neutral position.

In the steering control device for a work vehicle described above, it is preferable that the work equipment has a telescopic post capable of telescopic motion, provided to extend upward from the traveling body, and a work platform which is provided at the tip of the telescopic post, wherein the steering control tool is provided on the work platform.

In the steering control device for a work vehicle described above, it is preferable that the traveling body has front wheels and rear wheels arranged front-to-rear; and the front wheel is the steering wheel.

Advantageous Effects of the Invention

According to the present invention, as far as a steering angle of the steering wheel detected by the steering angle detector is kept within a predetermined angle range including a neutral steering angle, the steering control unit make a steering control to stop the steering actuator and to maintain the present steering angle of the steering wheel when the steering operation tool returns to the neutral position. As a result, returning the steering operation tool from the steering position to the neutral position maintains the steering angle of the steering wheel at the time when the steering operation tool returns to the neutral position when performing the steering operation of the steering operation tool to change the steering angle of the steering wheel within a predetermined angle range. Accordingly, slightly changing the traveling direction of the traveling body from a straight line does not require the traveling body traveling over a long distance to continue the operation of the steering operation tool in a position range near the neutral position. Therefore, it is possible to improve the operability of the working vehicle during long-distance running.

Further, preferably, when a steering angle of the steering wheel detected by the steering angle detector exceeds the predetermined angle range, the steering control unit make a steering control to operate the steering actuator so that the steering angle of the steering wheel becomes the neutral steering angle when the steering operation tool returns to the neutral position. Thus, when the steering operation of the steering operation tool changes the steering angle of the steering wheel beyond a predetermined angle range, returning the steering operation tool from the steering position to the neutral position can return the steering angle of the steering wheel to the neutral steering angle. Therefore, returning the steering operation tool from the steering position to the neutral position can return the steering angle of the steering wheel to the neutral steering angle by performing the steering operation of the steering operation tool so that the steering angle of the steering wheel changes beyond the predetermined angle range even in a state in which the steering angle of the steering wheel is maintained at the steering angle within the predetermined angle range.

Further, preferably, as far as a steering angle of the steering wheel detected by the steering angle detector is changed within the predetermined angle range during a steering operation of the steering operation tool, the steering control unit make a steering control to stop the steering actuator and to maintain the present steering angle of the steering wheel when the steering operation tool returns to the neutral position. Further, when a steering angle of the steering wheel detected by the steering angle detector exceeds the predetermined angle range during a steering operation of the steering operation tool, the steering control unit make a steering control to operate the steering actuator so that the steering angle of the steering wheel becomes the neutral steering angle when the steering operation tool returns to the neutral position. Thus, returning the steering operation tool from the steering position to the neutral position can maintain the steering angle of the steering wheel at the time when the steering operation tool returns to the neutral position by performing the steering operation of the steering operation tool so that the steering angle of the steering wheel changes within a predetermined angle range. Further, returning the steering operation tool from the steering position to the neutral position can return the steering angle of the steering wheel to the neutral steering angle, by performing the steering operation of the steering operation tool so that the steering angle of the steering wheel changes beyond a predetermined angle range.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only and thus are not limitative of the present invention.

FIG. 4B is a schematic diagram showing the steering angle of the front wheel when the extension amount of the steering cylinder is positive. FIG. 4C is a schematic diagram showing the steering angle of the front wheel when the extension amount of the steering cylinder is negative.

FIG. 6 A flowchart showing an example of a control flow according to a steering operation of a steering dial;

DESCRIPTION OF THE EMBODIMENTS

Figure 2:
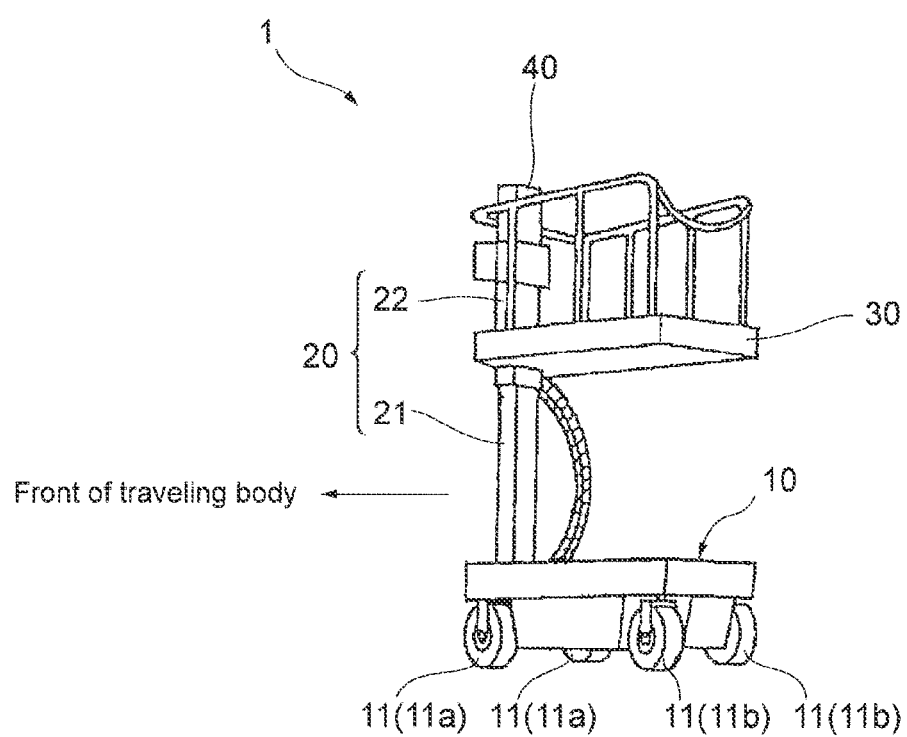
FIG. 2 A perspective view of a vehicle with an aerial work platform.

In the following, preferred embodiments of the present invention are described with reference to the drawings. FIG. 2 shows a vehicle with an aerial work platform 1 equipped with a steering control device according to the embodiment of the present invention.

The vehicle with an aerial work platform 1 is a so-called vertical lifting type. The vehicle with an aerial work platform 1 comprises a traveling body 10 capable of traveling by having four-tire wheels 11 provided at the front, rear, left, and right sides, a telescopic post 20 provided to extend vertically upward from the traveling body 10, and a work platform 30 for boarding an operator supported by the telescopic post 20. The traveling body 10 comprises a traveling motor (hydraulic motor) 12 inside (see FIG. 3). The traveling motor 12 can drive the rear tire wheel 11 (hereinafter referred to as the rear wheel 11b). It can steer the front tire wheel 11 (hereinafter referred to as the front wheel 11a) for traveling.

The telescopic post 20 includes a lower post 21 extending vertically upward from the traveling body 10, and an upper post 22 provided in a telescopic form with respect to the lower post 21. The telescopic post 20 incorporates a built-in lifting cylinder 23 (hydraulic cylinder) (see FIG. 1). The telescopic operation of the lifting cylinder 23 can raise (lift) and lower the upper post 22 in the vertical direction to extend and contract in the vertical direction. The work platform 30 is attached to the upper post 22. It can move up and down by the vertical extension/contraction operation of the extension/contraction of the telescopic post 20.

Figure 5:
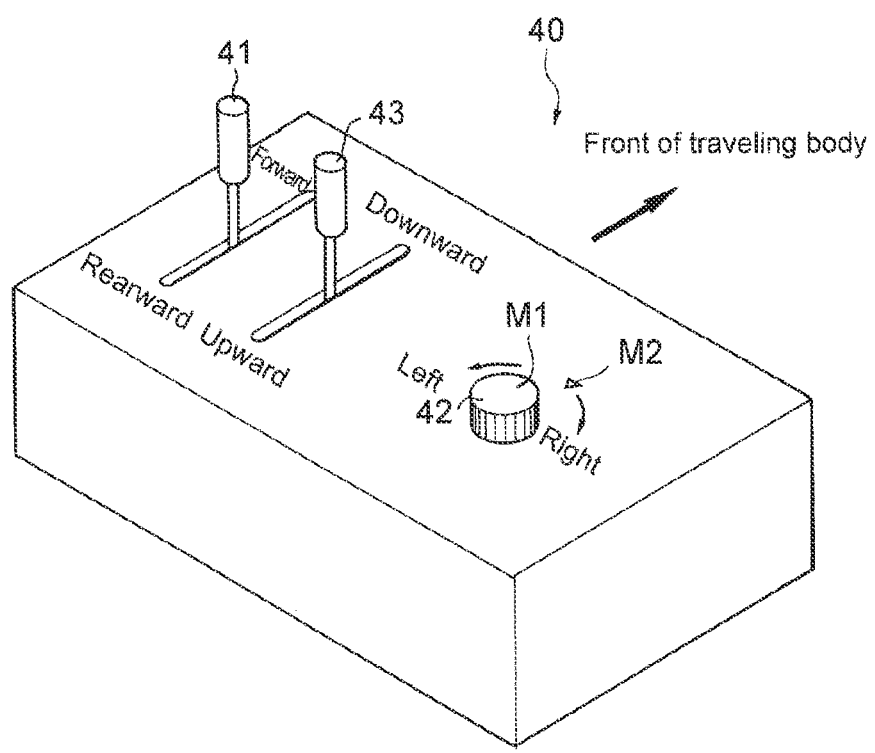
FIG. 5 A perspective view of an operation box.

An operation box 40 is attached to the work platform 30 (see also FIG. 5). As shown in FIG. 5, the operation box 40 comprises a traveling operation lever 41 for starting and stopping the traveling body 10 and switching between forward and rearward movement, a steering dial 42 for steering the traveling body 10 (i.e., steering operation of a front-wheel 11a which is a steering wheel), and a lifting operation lever 43 for lifting and lowering the work platform 30. An operator on the work platform 30 can move to an arbitrary work position by operating the traveling operation lever 41, the steering dial 42, and the lifting operation lever 43 to travel and steer the traveling body 10 and to raise and lower the work platform 30.

Figure 3:
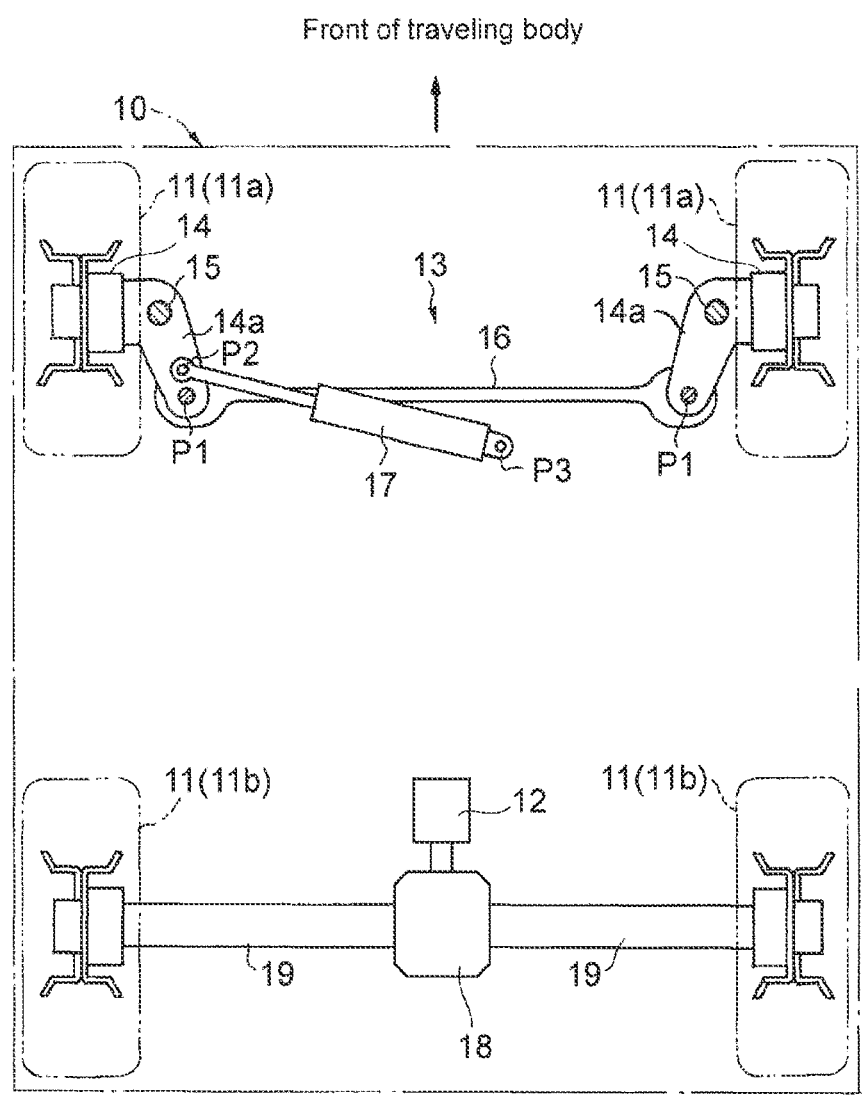
FIG. 3 A plan view showing a schematic configuration of a traveling body.

The front wheel 11a, a steering wheel, and the steering dial 42 are indirectly interlock-connected via a steering device. As shown in FIG. 3, the steering device includes a steering link mechanism 13 connected to the front wheel 11a, steering cylinder 17 (hydraulic cylinder) for changing the steering angle γ of the front wheel 11a (a deflection angle of the front wheel 11a with respect to the longitudinal central axis of the traveling body 10. See FIGS. 4A-4C) by driving the steering link mechanism 13, and a controller (see FIG. 1) for controlling the operation of the steering cylinder 17 in accordance with the steering operation of the steering dial 42.

As shown in FIG. 3, the steering link mechanism 13 includes left and right front wheel support members 14 for rotatably supporting the front wheels 11a, and tie rods 16 for connecting the left and right front wheel support members 14. The left and right front wheel support members 14 are attached to the traveling body 10 via kingpins 15 extending in the vertical direction, so that they can rock around the kingpins 15. Arm portions 14a are provided on the left and right front wheel support members 14 so as to extend rearward of the traveling body 10. Both ends of the tie rod 16 are connected to the arm portions 14a of the left and right front wheel support members 14 by connection pins P1.

One end of the steering cylinder 17 is connected to an arm portion 14a of the left front wheel support member 14 constituting the steering link mechanism 13 by a connecting pin P2. The other end of the steering cylinder 17 is connected to a cylinder connecting portion (not shown) of the traveling body 10 by a connecting pin P3. Therefore, extending and contracting the steering cylinder 17 can swing the left front wheel support member 14 around the kingpin 15 and swing the right front wheel support member 14 simultaneously and in the same direction as the left front wheel support member 14 via the tie-rod 16. Extending the steering cylinder 17 can direct the left and right front wheels 11a to the right. Contracting the steering cylinder 17 can direct the left and right front wheels 11a to the left.

Figure 4A:
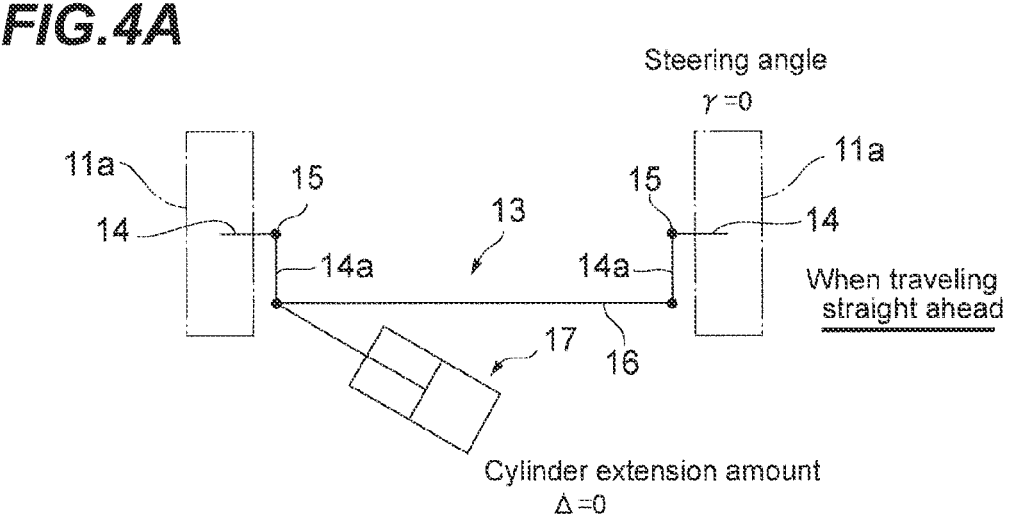
FIGS. 4A-4C FIG. 4A is a schematic diagram showing the steering angle of the front wheel when the extension amount of the steering cylinder is zero.
Figure 4B:
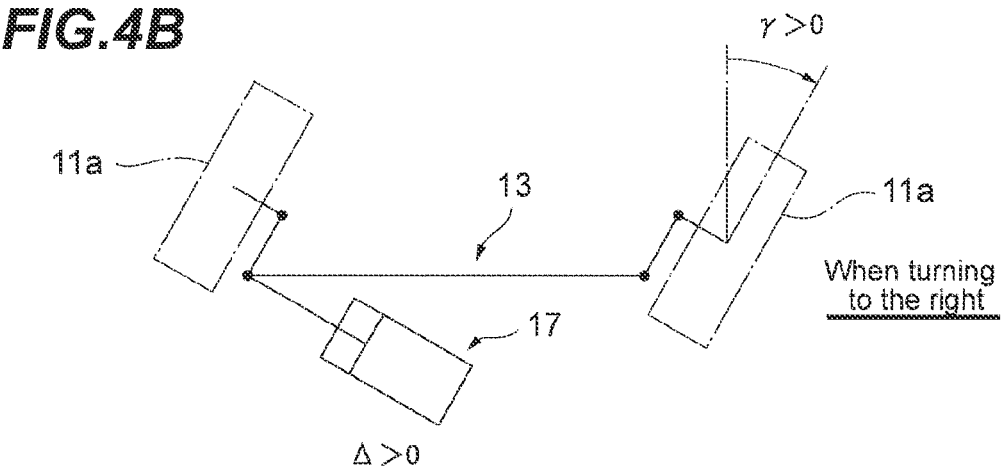
Figure 4C:
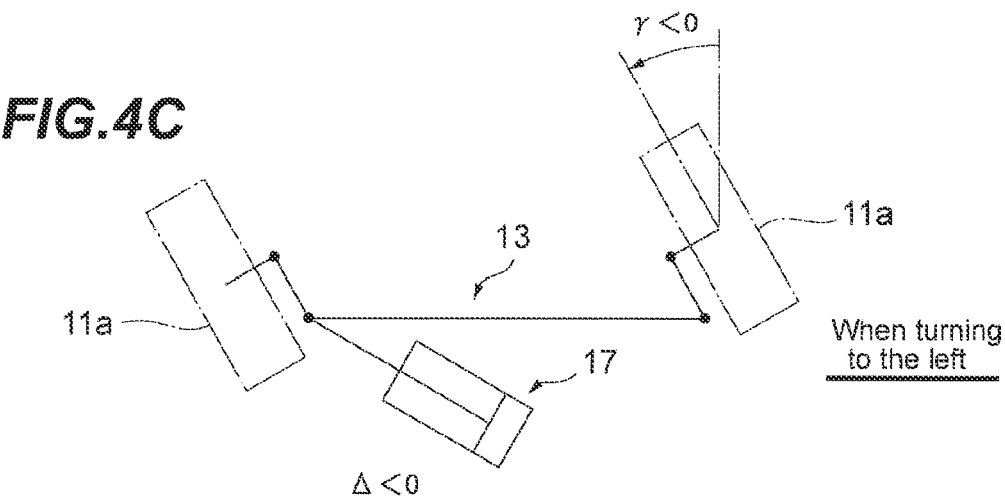

FIGS. 4A-4C show that when the extension amount Δ of the steering cylinder 17 is zero (Δ=0), the steering angle γ of the front wheel 11a is zero (γ=0) (see FIG. 4A). Here, the sign of the steering angle γ when the front wheel 11a is deflected to the right is defined as positive. The sign of the steering angle γ when the front wheel 11a is deflected to the left is defined as negative. When the extension amount Δ of the steering cylinder 17 is a positive value (Δ>0), the steering angle γ of the front wheel 11a is a positive value (γ>0) (see FIG. 4B). When the extension amount Δ of the steering cylinder 17 is a negative value (Δ<0), the steering angle γ of the front wheel 11a is a negative value (γ<0) (see FIG. 4C).

Figure 1:
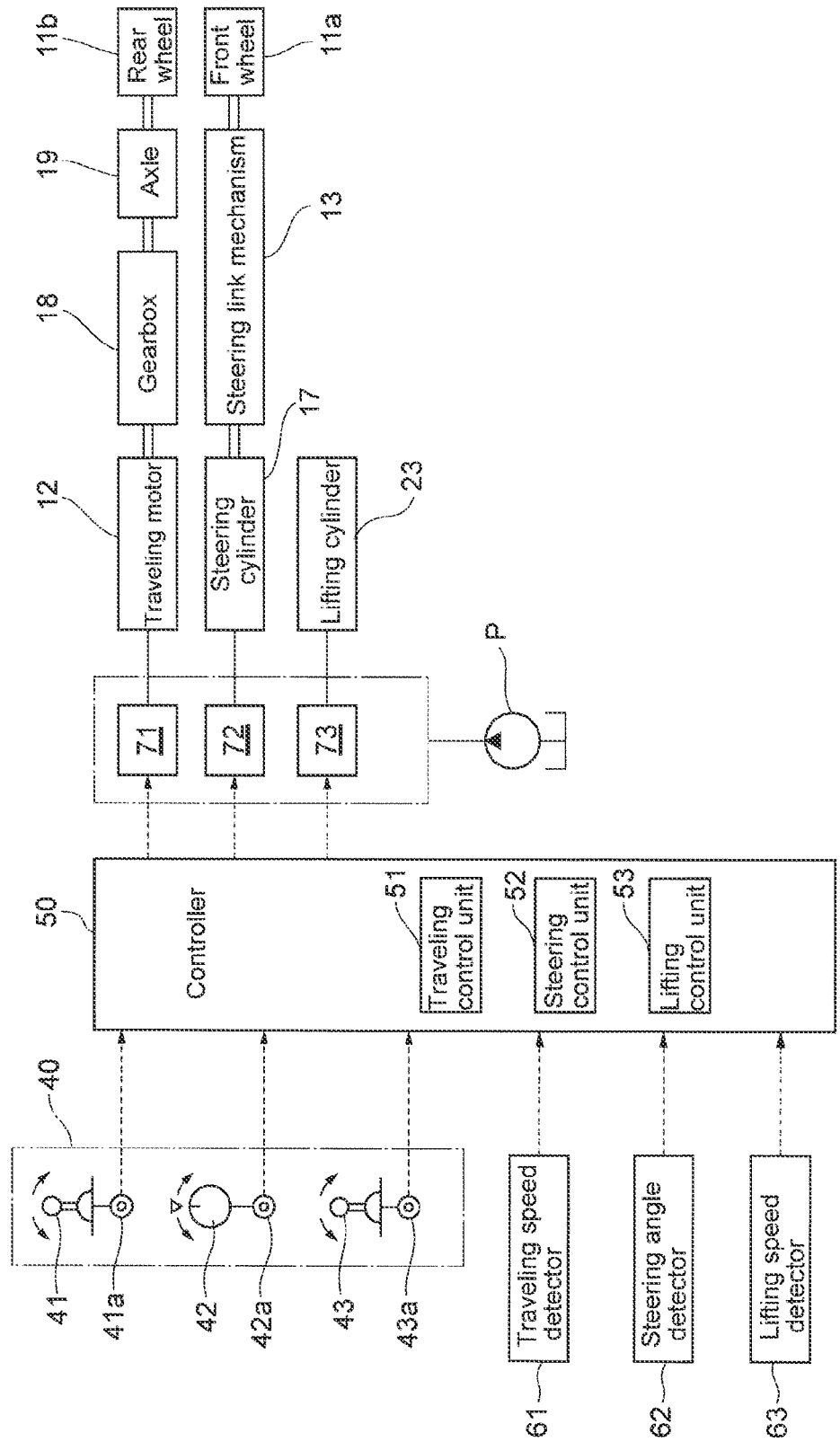
FIG. 1 A block diagram showing the control system of a vehicle with an aerial work platform.

Next, FIG. 1 describes operation control according to the operation of the traveling operation lever 41, the steering dial 42, and the lifting operation lever 43 provided in the operation box 40 of the work platform 30 in the above-described vehicle with an aerial work platform 1. FIG. 1 shows a transmission route of signals and power related to traveling and steering the traveling body 10 and lifting and lowering the work platform 30.

The traveling operation lever 41 is positioned at a neutral position (a position in a vertical position as shown in FIG. 5) in a non-operation status and can perform an operation of tilting forward or rearward with reference to the neutral position (hereinafter, this operation may be referred to as a traveling operation). The force of the built-in spring automatically returns the traveling operation lever 41 to the neutral position by releasing a hand operation in the traveling operation status. A traveling operation detector 41a comprising a potentiometer or the like provided in the operation box 40 detects the operation status (operation direction and operation amount with respect to the neutral position) of the traveling operation lever 41. The information on the operation status of the traveling operation lever 41 detected by the traveling operation detector 41a is input to the controller 50 provided in the work platform 30 or the traveling body 10.

The traveling operation with the traveling operation lever 41 tilting forward from the neutral position corresponds to the forward traveling command of the traveling body 10. The controller 50 sets a faster target traveling speed in accordance with a larger tilting amount of the traveling operation lever 41 when traveling forward. Further, the traveling operation with the traveling operation lever 41 tilting rearward from the neutral position corresponds to the rearward traveling command of the traveling body 10. The controller 50 sets a faster target traveling speed in accordance with a larger tilting amount of the traveling operation lever 41 when traveling rearward. The neutral return operation for returning the traveling operation lever 41 to the neutral position corresponds to a stop command of the traveling body 10.

The steering dial 42 is located at a neutral position (a position where the mark M1 on the steering dial 42 and the mark M2 on the operation box 40 coincide with each other, as shown in FIG. 5) in a non-operation status. A steering operation for rotating and displacing the steering dial 42 in a clockwise direction or a counterclockwise direction can be performed with reference to the neutral position. When a hand operation is released in the steering operation status, the force of the built-in spring automatically returns the steering dial 42 to the neutral position. The steering operation detector 42a, including a potentiometer or the like provided in the operation box 40 detects the operation status (operation direction and operation amount with respect to the neutral position) of the steering dial 42. Information on the operation status of the steering dial 42 detected by the steering operation detector 42a is input to the controller 50.

The steering operation for rotationally displacing the steering dial 42 clockwise corresponds to a steering command to the right of the front wheel 11a. The controller 50 sets the target steering angle to the right to a larger value in accordance with a larger rotational displacement of the steering dial 42 in the clockwise direction. Further, the steering operation for rotationally displacing the steering dial 42 counterclockwise corresponds to a steering command to the left of the front wheel 11a. The controller 50 sets the target steering angle to the left to a larger value in accordance with a larger rotational displacement of the steering dial 42 in the counterclockwise direction. The neutral return operation for returning the steering dial 42 to the neutral position corresponds to a command to set the front wheel 11a in the steering angle zero (the state of γ=0. See FIG. 4A).

The lifting operation lever 43 is positioned at a neutral position (a position in a vertical position as shown in FIG. 5) in a non-operation status. It can perform a lifting/lowering operation for tilting forward or rearward with reference to the neutral position. Releasing a hand operation in the lifting operation status automatically returns the lifting operation lever 43 to the neutral position by the force of the built-in spring. A lifting operation detector 43a, including a potentiometer or the like provided in the operation box 40 detects the operation status (operation direction and operation amount with respect to the neutral position) of the lifting operation lever 43. Information relating to the operation status of the lifting operation lever 43 detected by the lifting operation detector 43a is input to the controller 50.

An operation for tilting the lifting operation lever 43 forward from the neutral position corresponds to a lowering command for the work platform 30. The controller 50 sets a faster target operating speed in accordance with a larger tilting amount of the lifting operation lever 43 when lowering the work platform 30. Further, an operation for tilting the lifting operation lever 43 rearward from the neutral position corresponds to a lifting (raising) command of the work platform 30. The controller 50 sets a faster target operating speed in accordance with a larger tilting amount of the lifting operation lever 43 when lifting the work platform 30. The neutral return operation for returning the lifting operation lever 43 to the neutral position corresponds to a stop command for the work platform 30.

A hydraulic pump P (see FIG. 1) driven by a power source (not shown) composed of an electric motor, a small engine, or the like, is provided inside the traveling body 10. Pressurized oil discharged from the hydraulic pump P is supplied to the traveling motor 12 via the traveling control valve 71. The right and left rear wheels 11b, which are driving wheels of the traveling body 10, are attached to the right and left axles 19 driven by the traveling motor 12 via the gearbox 18 (see FIG. 3). The controller 50 electromagnetically drives a spool (not shown) of the traveling control valve 71 in accordance with an operation status of the traveling operation lever 41. As a result, the operator on work platform 30 can start and stop the traveling body 10, switch the traveling direction (forward and rearward), and set the traveling speed by the traveling operation of the traveling operation lever 41.

Pressurized oil discharged from the hydraulic pump P is supplied to the steering cylinder 17 via the steering control valve 72. The controller 50 electromagnetically drives a spool (not shown) of the steering control valve 72 in accordance with an operation status of the steering dial 42. As a result, the operator on the work platform 30 can extend and contract the steering cylinder 17 by steering operation of the steering dial 42, thereby steering the front wheel 11a.

Pressurized oil discharged from the hydraulic pump P is supplied to the lifting cylinder 23 via the lifting control valve 73. The controller 50 electromagnetically drives a spool (not shown) of the lifting control valve 73 in accordance with an operation status of the lifting operation lever 43. As a result, the operator on the work platform 30 can move the work platform 30 up and down by the lifting operation of the lifting operation lever 43.

The traveling body 10 is provided with a traveling speed detector 61 for detecting the traveling speed of the traveling body 10 from the rotational speed of the axle 19 of the rear wheel 11b, and a steering angle detector (for example, a potentiometer) 62 for detecting the steering angle of the front wheel 11a from the rotational angle around the kingpin 15 of the front wheel support member 14 (see FIG. 1). The telescopic post 20 includes a built-in lifting speed detector 63 for detecting the lifting speed of the work platform 30 from the operating speed of the lifting cylinder 23, or the like (see FIG. 1). Information on the traveling speed of the traveling body 10 detected by the traveling speed detector 61, information on the steering angle detected by the steering angle detector 62, and information on the lifting speed of the work platform 30 detected by the lifting speed detector 63 are all input to the controller 50.

The controller 50 includes a traveling control unit 51, a steering control unit 52, and a lifting control unit 53. When information on the operation status (operation direction and operation amount with reference to the neutral position) of the traveling operation lever 41 detected by the traveling operation detector 41a is input, the traveling control unit 51 sets the target traveling speed of the traveling body 10 based on the input information on the operation status of the traveling operation lever 41. Then, the traveling control unit 51 performs traveling control in which the spool of the traveling control valve 71 is driven to rotationally operate the traveling motor 12 so that the traveling speed of the traveling body 10 detected by the traveling speed detector 61 becomes the target traveling speed set according to the operation status of the traveling operation lever 41, for example, the traveling operation position of the traveling operation lever 41 in which the traveling operation is performed in the operation direction and the operation amount with reference to the neutral position.

The steering control unit 52 sets a target steering angle of the front wheel 11a based on the input information on the operation status of the steering dial 42, when information on operation status (the operation direction and the operation amount with reference to the neutral position) of the steering dial 42 detected by the steering operation detector 42a is input. Then, the steering control unit 52 performs steering control in which the steering control valve 72 is driven to extend and contract the steering cylinder 17 so that the steering angle of the front wheel 11a detected by the steering angle detector 62 becomes a target steering angle set in accordance with the operation status of the steering dial 42, for example, the steering position of the steering dial 42 where the steering operation is performed by the operation direction and the operation amount based on the neutral position.

The lifting control unit 53 sets the target lifting speed of the work platform 30 based on the input information on the operation status of the lifting operation lever 43 when information on the operation status (operation direction and operation amount with reference to the neutral position) of the lifting operation lever 43 detected by the lifting operation detector 43a is input. The lifting control unit 53 performs lifting control in which the spool of the lifting control valve 73 is driven to extend and contract the lifting cylinder 23 so that the lifting speed of the work platform 30 detected by the lifting speed detector 63 becomes the target lifting speed set in accordance with the operation status of the lifting operation lever 43, for example, the lifting operation position of the lifting operation lever 43 where the lifting operation is performed by the operation direction and the operation amount with reference to the neutral position.

When the vehicle with an aerial work platform 1 constructed as described above is used for aerial work, first, an operator on the work platform 30 operates the traveling operation lever 41 and the steering dial 42 of the operation box 40 to move the traveling body 10 (vehicle with an aerial work platform 1) to the work place. Subsequently, the operator on work platform 30 operates the lifting operation lever 43 of the operation box 40 to lift the work platform 30 to an arbitrary work height. After completing the work, the operator on work platform 30 operates the lifting operation lever 43 to lower the work platform 30 and store it on the traveling body 10. Then, the operator on work platform 30 operates the traveling operation lever 41 and the steering dial 42 to move the traveling body 10 (the vehicle with an aerial work platform 1) to the storage place.

A specific example of the operation control according to the steering operation of the steering dial 42 is described with reference to FIG. 6. FIG. 6 shows an example of a control flow corresponding to the steering operation of the steering dial 42.

In step S101, controller 50 determines whether or not the steering angle of the front wheel 11a detected by the steering angle detector 62 is zero (0°), and the steering dial 42 is in the neutral position. Controller 50 determines whether or not the steering dial 42 is positioned at the neutral position on the basis of information on the operation status (operation direction and operation amount with reference to the neutral position) of the steering dial 42 input from the steering operation detector 42a.

If the judgment in step S101 is YES, the process proceeds to step S102. In step S102, controller 50 sets the neutral return cancel flag=ON and proceeds to step S103. On the other hand, if the judgment in step S101 is NO, the process proceeds to step S103.

In step S103, controller 50 determines whether or not the steering angle of the front wheel 11a detected by the steering angle detector 62 is within a predetermined angle range, including the neutral steering angle. The neutral steering angle is a target steering angle of the front wheel 11a corresponding to the neutral position of the steering dial 42 and is set to zero (0°) in the present embodiment. The predetermined angle range is set to an angle range in the vicinity of zero (for example, an angle range of ±5°) for maintaining the steering angle of the front wheel 11a at a desired steering angle.

If the judgment in step S103 is NO, the process proceeds to step S104. In step S104, controller 50 sets the neutral return cancel flag=OFF and proceeds to step S105. On the other hand, if the judgment in step S103 is YES, the process proceeds to step S105.

In step S105, controller 50 determines whether or not the steering dial 42 is located at the steering position rotationally displaced from the neutral position due to the steering operation. Controller 50 determines whether or not the steering dial 42 is located at the steering position where the steering dial 42 is rotationally displaced from the neutral position based on information on the operation status of the steering dial 42 input from the steering operation detector 42a.

If the judgment in step S105 is YES, the process proceeds to step S106. In step S106, the steering control unit 52 of the controller 50 sets the target steering angle of the front wheel 11a corresponding to the steering position of the steering dial 42 on the basis of information on the operation status of the steering dial 42 input from the steering operation detector 42a. Then, the steering control unit 52 performs steering control in which the steering control valve 72 is driven to extend and contract the steering cylinder 17 so that the steering angle of the front wheel 11a detected by the steering angle detector 62 becomes a target steering angle corresponding to the steering position of the steering dial 42. Then, the control flow in this case ends.

If the judgment in step S105 is NO, the process proceeds to step S107. In step S107, controller 50 determines whether or not the neutral return cancel flag=ON. If the judgment in step S107 is NO, the process proceeds to step S108. In step S108, the steering control unit 52 of the controller 50 sets the target steering angle of the front wheel 11a to the neutral steering angle corresponding to the neutral position of the steering dial 42 (i.e., to zero (0°)). Then, the steering control unit 52 performs neutral return control in which the steering control valve 72 is driven to extend and contract the steering cylinder 17 so that the steering angle of the front wheel 11a detected by the steering angle detector 62 becomes the neutral steering angle (i.e., becomes zero (0°)). Then, the control flow in this case ends.

If the judgment in step S107 is YES, the process proceeds to step S109. In step S109, the steering control unit 52 of the controller 50 maintains the steering angle of the front wheel 11a in a state where the steering cylinder 17 is stopped without performing the control for extending and contracting the steering cylinder 17. Then, the control flow in this case ends.

When the traveling body 10 is traveling straight, the steering angle of the front wheel 11a detected by the steering angle detector 62 is zero (0°), and the steering dial 42 is positioned at the neutral position. Therefore, in the control flow shown in FIG. 6, the judgment is YES in step S101, and the process proceeds to step S102. In step S102, the neutral return cancel flag is set to ON, and the process proceeds to step S103. Since the steering angle of the front wheel 11a is zero (0°) within the predetermined angle range, the judgment is YES in step S103, and the process proceeds to step S105. Since the steering dial 42 is not located at the steering position but at the neutral position, the judgment result in step S105 is NO, and the process proceeds to step S107. As described above, since the neutral return cancel flag=ON, the judgment is YES in step S107, and the process proceeds to step S109. In step S109, the steering control unit 52 of the controller 50 maintains the steering angle of the front wheels 11a in a state where the steering cylinder 17 is stopped without performing the control for extending and contracting the steering cylinder 17. As a result, the steering angle of the front wheel 11a is maintained at zero (0°).

Next, a case is described where the steering dial 42 is steered in the clockwise direction while the traveling body 10 is traveling straight, and the steering dial 42 is located at a steering position where the steering dial 42 is largely rotationally displaced from the neutral position. In this case, in the control flow of FIG. 6, the judgment is NO in step S101, and the process proceeds to step S103. Since the steering angle of the front wheel 11a is zero (0°) within the predetermined angle range, the judgment is YES in step S103, and the process proceeds to step S105. Since the steering dial 42 is positioned at the steering position, the judgment is YES in step S105, and the process proceeds to step S106. In step S106, the steering control unit 52 of the controller 50 sets, for example, the target steering angle to +30° (30° to the right) in accordance with the steering position of the steering dial 42. Then, the steering control unit 52 performs steering control for extending the steering cylinder 17 until the steering angle of the front wheel 11a detected by the steering angle detector 62 matches the target steering angle (+30°). As a result, the steering angle of the front wheel 11a changes from zero (0°) to +30°.

Next, a description is given of a case where a hand operation is released from the steering dial 42 and the steering dial 42 returns from the steering position to the neutral position (by the force of the built-in spring) in a state where the steering angle of the front wheel 11a is +30° by the steering control of the steering control unit 52. In this case, in the control flow of FIG. 6, the judgment is NO in step S101, and the process proceeds to step S103. Since the steering angle of the front wheel 11a is +30° exceeding the predetermined angle range, the judgment is NO in step S103, and the process proceeds to step S104. In step S104, the neutral return cancel flag is set to "OFF," and the process proceeds to step S105. Since the steering dial 42 is not located at the steering position but at the neutral position, the judgment result in step S105 is NO, and the process proceeds to step S107. As described above, since the neutral return cancel flag=OFF, the judgment is NO in step S107, and the process proceeds to step S108. In step S108, the steering control unit 52 of the controller 50 sets the target steering angle to the neutral steering angle (zero (0°)). Then, the steering control unit 52 performs neutral return control for contracting the steering cylinder 17 until the steering angle of the front wheel 11a detected by the steering angle detector 62 coincides with the neutral steering angle (zero (0°)). As a result, the steering angle of the front wheel 11a returns from +30° to zero (0°).

Next, a description is given of a case where the steering dial 42 is steered in the clockwise direction while the traveling body 10 is traveling straight, and the steering dial 42 is located at a steering position where the rotational displacement is relatively small from the neutral position. In this case, in the control flow of FIG. 6, the judgment is NO in step S101, and the process proceeds to step S103. Since the steering angle of the front wheel 11a is zero (0°) within the predetermined angle range, the judgment is YES in step S103, and the process proceeds to step S105. Since the steering dial 42 is positioned at the steering position, the judgment is YES in step S105, and the process proceeds to step S106. In step S106, the steering control unit 52 of the controller 50 sets, for example, the target steering angle to +4° (4° to the right) in accordance with the steering position of the steering dial 42. Then, the steering control unit 52 performs steering control for extending the steering cylinder 17 until the steering angle of the front wheel 11a detected by the steering angle detector 62 matches the target steering angle (+4°). As a result, the steering angle of the front wheel 11a is changed from zero (0°) to +4°.

Next, a description is given of a case where a hand operation is released from the steering dial 42 and the steering dial 42 returns from the steering position to the neutral position (by the force of the built-in spring) in a state where the steering angle of the front wheel 11a is +4° by the steering control of the steering control unit 52. In this case, in the control flow of FIG. 6, the judgment is NO in step S101, and the process proceeds to step S103. Since the steering angle of the front wheel 11a is +4° within the predetermined angle range, the judgment is YES in step S103, and the process proceeds to step S105. Since the steering dial 42 is not located at the steering position but at the neutral position, the judgment result in step S105 is NO, and the process proceeds to step S107. Since the neutral return cancel flag=ON, the judgment is YES in step S107 and the process proceeds to step S109. In step S109, the steering control unit 52 of the controller 50 stops the steering cylinder 17 and maintains the steering angle of the front wheel 11a without performing the neutral return control for contracting the steering cylinder 17. In this case, the steering dial 42 passes a steering position corresponding to a steering angle between +4° and the neutral steering angle (zero (0°)) (for example, +2°, +3°, etc.), but since the operation does not exceed +4° which is the steering angle of the front wheel 11a at which the steering cylinder 17 is stopped, the steering dial 42 returns to the neutral position without steering control being performed. Therefore, the steering angle of the front wheel 11a is maintained at the steering angle at the steering position before the steering dial 42 returns to the neutral position, that is, +4°.

Next, a description is given of a case where the steering dial 42 is turned in the counterclockwise direction while the steering angle of the front wheel 11a is maintained at +4°, and the steering dial 42 is positioned at a steering position where the steering dial 42 is slightly rotationally displaced from the neutral position. In this case, in the control flow of FIG. 6, the judgment is NO in step S101, and the process proceeds to step S103. Since the steering angle of the front wheel 11a is +4° within the predetermined angle range, the judgment is YES in step S103, and the process proceeds to step S105. Since the steering dial 42 is positioned at the steering position, the judgment is YES in step S105, and the process proceeds to step S106. In step S106, the steering control unit 52 of the controller 50 sets, for example, the target steering angle to −2° (2° in the left direction) corresponding to the steering position of the steering dial 42. Then, the steering control unit 52 performs steering control for contracting the steering cylinder 17 until the steering angle of the front wheel 11a detected by the steering angle detector 62 matches the target steering angle (−2°). As a result, the steering angle of the front wheel 11a changes from +4° to −2°.

Next, a description is given of a case where a hand operation is released from the steering dial 42 and the steering dial 42 returns from the steering position to the neutral position (by the force of the built-in spring) in a state where the steering angle of the front wheel 11a is set to −2° by the steering control of the steering control unit 52. In this case, in the control flow shown in FIG. 6, the same processing as that in the case where the steering dial 42 returns from the steering position to the neutral position is performed in the state where the steering angle of the front wheel 11a is +4° by the steering control of the steering control unit 52. In this case, the steering dial 42 passes the steering position corresponding to a steering angle (e.g., −1° or the like) between −2° and the neutral steering angle (zero (0°)). However, since the steering dial 42 does not exceed −2°, which is the steering angle of the front wheel 11a that has stopped the steering cylinder 17 in this operation, the steering dial 42 returns to the neutral position without steering control. Therefore, the steering angle of the front wheel 11a is maintained at the steering angle at the steering position before the steering dial 42 returns to the neutral position, that is, −2°. Thus, the steering angle of the front wheel 11a at this time, i.e., the steering angle of the front wheel 11a at the time when the steering dial 42 returns to the neutral position, is maintained, even if the steering dial 42 returns from the steering position to the neutral position when the steering angle of the front wheel 11a changes within a predetermined angle range (e.g., within an angle range of ±5°). Even when the steering angle of the front wheel 11a is maintained within a predetermined angle range, the steering angle of the front wheel 11a can be set to a steering angle (e.g., ±1°, ±2° etc.) close to the neutral steering angle (zero (0°)) by steering operation of the steering dial 42 in the opposite direction beyond the neutral position.

Next, a case is described where the steering dial 42 is turned in the clockwise direction while the steering angle of the front wheel 11a is maintained at +4°, and the steering dial 42 is located at a steering position where the steering dial 42 has a relatively large rotational displacement from the neutral position. In this case, in the control flow of FIG. 6, the judgment is NO in step S101, and the process proceeds to step S103. Since the steering angle of the front wheel 11a is +4° within the predetermined angle range, the judgment is YES in step S103, and the process proceeds to step S105. Since the steering dial 42 is positioned at the steering position, the judgment is YES in step S105, and the process proceeds to step S106. In step S106, the steering control unit 52 of the controller 50 sets, for example, the target steering angle to +15° (15° to the right) in accordance with the steering position of the steering dial 42. Then, the steering control unit 52 performs steering control for extending the steering cylinder 17 until the steering angle of the front wheel 11a detected by the steering angle detector 62 matches the target steering angle (+15°). As a result, the steering angle of the front wheel 11a changes from +4° to +15°.

Next, a case is described where a hand operation is released from the steering dial 42 and the steering dial 42 returns from the steering position to the neutral position (by the force of the built-in spring) in a state where the steering angle of the front wheel 11a is +15° by the steering control of the steering control unit 52. In this case, in the control flow of FIG. 6, the judgment is NO in step S101, and the process proceeds to step S103. Since the steering angle of the front wheel 11a is +15° exceeding the predetermined angle range, the judgment is NO in step S103, and the process proceeds to step S104. In step S104, the neutral return cancel flag is set to "OFF," and the process proceeds to step S105. Since the steering dial 42 is not located at the steering position but at the neutral position, the judgment result in step S105 is NO, and the process proceeds to step S107. As described above, since the neutral return cancel flag=OFF, the judgment is NO in step S107, and the process proceeds to step S108. In step S108, the steering control unit 52 of the controller 50 sets the target steering angle to the neutral steering angle (zero (0°)). Then, the steering control unit 52 performs neutral return control for contracting the steering cylinder 17 until the steering angle of the front wheel 11a detected by the steering angle detector 62 coincides with the neutral steering angle (zero (0°)). As a result, the steering angle of the front wheel 11a returns from +15° to zero (0°). Thus, steering the steering dial 42 so that the steering angle of the front wheel 11a changes beyond the predetermined angle range returns the steering dial 42 from the steering position to the neutral position and can return the steering angle of the front wheel 11a to the neutral steering angle (zero (0°)) even in a state in which the steering angle of the front wheel 11a is maintained at a steering angle within a predetermined angle range.

As described above, the steering control unit 52 stops the steering cylinder 17 to maintain the steering angle of the front wheel 11a when the steering dial 42 returns from the steering position to the neutral position, in the case steering control changes the steering angle of the front wheel 11a (steering wheel) detected by the steering angle detector 62 within a predetermined angle range including the neutral steering angle (zero (0°)), according to the present embodiment. As a result, when steering operation of the steering dial 42 changes the steering angle of the front wheel 11a within a predetermined angle range, the steering angle of the front wheel 11a at the time when the steering dial 42 returns to the neutral position is maintained, even if the steering dial 42 is returned from the steering position to the neutral position. Therefore, a slight change of the traveling direction of the traveling body 10 from straight does not require continuing the steering dial 42 in a position range near the neutral position when driving the traveling body 10 for a long distance. Therefore, it allows improving the operability of the vehicle with an aerial work platform 1 during long-distance operation.

The steering control unit 52 performs neutral return control for operating the steering cylinder 17 so that the steering angle of the front wheel 11a detected by the steering angle detector 62 becomes the neutral steering angle when the steering dial 42 returns from the steering position to the neutral position if steering control changes the steering angle of the front wheel 11a detected by the steering angle detector 62 beyond a predetermined angle range. Thus, returning the steering dial 42 from the steering position to the neutral position can return the steering angle of the front wheel 11a to the neutral steering angle (zero (0°)), if steering operation of the steering dial 42 changes the steering angle of the front wheel 11a beyond a predetermined angle range. Therefore, a steering operation of the steering dial 42 changing the steering angle of the front wheel 11a beyond the predetermined angle range can return the steering angle of the front wheel 11a to the neutral steering angle by returning the steering dial 42 from the steering position to the neutral position even when the steering angle of the front wheel 11a is maintained at a steering angle within a predetermined angle range.

The steering control unit 52 stops the steering cylinder 17 and maintains the steering angle of the front wheel 11a when the steering dial 42 returns from the steering position to the neutral position, if the steering angle of the front wheel 11a detected by the steering angle detector 62 changes within a predetermined angle range until the steering dial 42 is displaced from the neutral position by steering operation and returns to the neutral position again. The steering control unit 52 performs neutral return control when the steering dial 42 returns from the steering position to the neutral position if the steering angle of the front wheel 11a detected by the steering angle detector 62 changes beyond a predetermined angle range until the steering dial 42 is displaced from the neutral position and returns to the neutral position again by the steering operation. Thus, the steering operation of the steering dial 42 changes the steering angle of the front wheel 11a within a predetermined angle range. Therefore, returning the steering dial 42 from the steering position to the neutral position can maintain the steering angle of the front wheel 11a at the time when the steering dial 42 returns to the neutral position. Further, the steering operation of the steering dial 42 changes the steering angle of the front wheel 11a beyond a predetermined angle range. Thus, returning the steering dial 42 from the steering position to the neutral position can return the steering angle of the front wheel 11a to the neutral steering angle (zero (0°)).

In the above-described embodiment, returning the steering dial 42 from the steering position to the neutral position can return the steering angle of the front wheel 11a to the neutral steering angle (zero (0°)) by performing a steering operation of the steering dial 42 so that the steering angle of the front wheel 11a changes beyond a predetermined angle range while the steering angle of the front wheel 11a is maintained at a steering angle within a predetermined angle range, but the present invention is not limited to this. For example, a neutral return means (not shown) may be provided capable of returning the steering angle of the front wheel 11a to the neutral steering angle in response to an operation of a reset button, or the like (not shown), in a state maintaining the steering angle of the front wheel 11a at a steering angle within a predetermined angle range.

In the above-described embodiment, the steering dial 42 is used as the steering operation tool for a steering operation in which the steering wheel is rotationally displaced from the neutral position. However, the present invention is not limited to this. For example, a steering lever may be used for a steering operation tilting the steering wheel from the neutral position.

In the above-described embodiment, a hydraulic motor constitutes the traveling motor 12. However, the present invention is not limited to this. An electric motor may be used in the invention.

In the above-described embodiment, the telescopic post 20 capable of lifting and lowering the work platform 30 is provided on the traveling body 10, but the present invention is not limited to this. For example, the traveling body may include a scissors link mechanism capable of lifting and lowering the work platform and may comprise a boom capable of moving the work platform up and down. Further, the present invention can be applied to the work platform 30 and a work vehicle in which work equipment such as a crane is provided on a wheel-driven traveling body.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

RELATED APPLICATIONS

This invention claims the benefit of Japanese Patent Application No. 2020-173698 which is hereby incorporated by reference.

The invention claimed is:

1. A steering control device for a work vehicle, comprising:
   a traveling body capable of traveling with a steered wheel,
   a work equipment provided on the traveling body,
   a steering operation tool, which is biased to be located at a neutral position in a non-operation status, for making a steering operation by being displaced from the neutral position,
   a steering angle detector for detecting a steering angle of the steered wheel,
   a steering actuator for changing the steering angle of the steered wheel, and
   a steering control unit for controlling an operation of the steering actuator so that a steering angle of the steered wheel detected by the steering angle detector becomes a target steering angle corresponding to a steering position of the steering operation tool, wherein
   when the steering operation tool has been displaced from the neutral position to a steering operation range and then has been moved back to the neutral position,
   if a maximum steered angle of the steered wheel detected by the steering angle detector is within a predetermined steering angle range, the steering control unit controls the steering actuator to stop actuation of the steering actuator to maintain the steering angle of the steered wheel at a present steering angle existing when the steering operation tool has been moved back to the neutral position, and
   if a maximum steered angle of the steered wheel detected by the steering angle detector exceeds the predetermined steering angle range, the steering control unit controls the steering actuator to control the steering angle of the steered wheel to move back to a neutral steering angle in correspondence with moving the steering operation tool back to the neutral position.

2. The steering control device for a work vehicle according to claim 1, wherein
   the work equipment has a telescopic post capable of telescopic motion, provided to extend upward from the traveling body,
   and a work platform which is provided at a tip of the telescopic post, wherein the steering control tool is provided on the work platform.

3. The steering control device for a work vehicle according to claim 1, wherein;
   the traveling body has front wheels and rear wheels arranged front-to-rear; and
   the front wheel is the steered wheel.

* * * * *